US008842882B2

(12) United States Patent
Fedorovskaya et al.

(10) Patent No.: US 8,842,882 B2
(45) Date of Patent: Sep. 23, 2014

(54) INDIVIDUALIZING GENERIC COMMUNICATIONS

(75) Inventors: Elena A. Fedorovskaya, Pittsford, NY (US); Ronald Steven Cok, Rochester, NY (US)

(73) Assignee: Apple Inc., Cupertino, CA (US)

( * ) Notice: Subject to any disclaimer, the term of this patent is extended or adjusted under 35 U.S.C. 154(b) by 257 days.

(21) Appl. No.: 13/537,112

(22) Filed: Jun. 29, 2012

(65) Prior Publication Data

US 2014/0003652 A1    Jan. 2, 2014

(51) Int. Cl.
*G06K 9/00*    (2006.01)

(52) U.S. Cl.
USPC .......... 382/103; 382/115; 382/278; 340/5.52; 340/5.81

(58) Field of Classification Search
USPC ........ 382/103, 115, 278, 282; 340/5.52, 5.81, 340/5.82
See application file for complete search history.

(56) References Cited

U.S. PATENT DOCUMENTS

| 6,282,317 | B1 | 8/2001 | Luo et al. | |
|---|---|---|---|---|
| 6,671,405 | B1 | 12/2003 | Savakis et al. | |
| 7,271,809 | B2 | 9/2007 | Fedorovskaya et al. | |
| 8,135,684 | B2 | 3/2012 | Fedorovskaya et al. | |
| 8,229,458 | B2 * | 7/2012 | Busch | 455/456.1 |
| 8,244,573 | B2 * | 8/2012 | Hahn et al. | 705/7.33 |
| 8,559,977 | B2 * | 10/2013 | Busch | 455/456.1 |
| 8,566,236 | B2 * | 10/2013 | Busch | 705/39 |
| 8,611,601 | B2 * | 12/2013 | Calman et al. | 382/103 |
| 2002/0100042 | A1 | 7/2002 | Khoo | |
| 2003/0128389 | A1 | 7/2003 | Matraszek et al. | |
| 2004/0075743 | A1 | 4/2004 | Chatani | |

FOREIGN PATENT DOCUMENTS

| GB | 2404751 | 2/2005 |
|---|---|---|
| WO | 2007125285 | 11/2007 |

OTHER PUBLICATIONS

D. Joshi, and J. Luo, "Inferring Generic Activities and Events using Visual Content and Bags of Geo-tags", *Proceedings of Conference on Image and Video Retrieval*, 2008.
A. Yanagawa, S. F. Chang, L. Kennedy, and W. Hsu, "Columbia University's Baseline Detectors for 374 LSCOM Semantic Visual Concepts", *Columbia University ADVENT Technical Report #222-2006-8*, 2007.
Scott, "Images in Advertising: The Need for a Theory of Visual Rhetoric", *The Journal of Consumer Research*, vol. 21, No. 2 (Sep. 1994), pp. 252-273).
Teigen, K., "The novel and the familiar: Sources of interest in verbal information", *Current Psychology*, 1985. 4(3): p. 224-238.
Yonelinas, A., "The Nature of Recollection and Familiarity: A Review of 30 Years of Research", *Journal of Memory and Language*, 2002. 46(3): p. 441-517.
Vaiapury and Kankanhalli, in "Finding Interesting Images in Albums using Attention", *Journal of Multimedia*, 2008: p. 2-13.

(Continued)

*Primary Examiner* — Yosef Kassa

(74) *Attorney, Agent, or Firm* — Wong, Cabello, Lutsch, Rutherford & Brucculeri LLP

(57) ABSTRACT

A method of making individualized communications includes providing one or more images including each of a plurality of individuals, automatically extracting one or more individual appearance attributes for each of the individuals from the image including the individual, providing a communication that is generic to the individuals, using a processor to make an individualized communication for each of the individuals by modifying the generic communication in accordance with the one or more individual appearance attributes associated with the individual, communicating the individualized communication to a corresponding individual.

21 Claims, 8 Drawing Sheets

(56) References Cited

OTHER PUBLICATIONS

Katti et al. In "Pre-attentive discrimination of interestingness in images. in Multimedia and Expo", *2008 IEEE International Conference*, 2008, Hannover, Germany.

Halonen, R. S. Westman, and P. Oittinen. "Naturalness and interestingness of test images for visual quality evaluation", in *Image Quality and System Performance VIII. SPIE*, 2011, IEEE.

Haserot in: Haserot, F.S., "Beauty and Interestingness", *Journal of Philosophy*, 1952. XLIX(8): p. 261-273.

P. Viola and M. Jones, in Computer Vision and Pattern Recognition, 2001, *Proceedings of the 2001 IEEE Computer Society Conference*, 2001, pp. 1-511-1-518 vol. 1.

"Feature-centric evaluation for efficient cascaded object detection", by H. Schneiderman, in Computer Vision and Pattern Recognition, 2004; *Proceedings of the 2004 IEEE Computer Society Conference*, 2004, pp. 11-29-11-36, vol. 2.

T. F. Cootes, C. J. Taylor, D. H. Cooper, and J. Graham, *Computer Vision and Image Understanding*, vol. 61, pp. 38-59, 1995.

"Facial Pose Estimation Using a Symmetrical Feature Model", by R.W. Ptucha, A. Savakis, *Proceedings of ICME Workshop on Media Information Analysis for Personal and Social Applications*, 2009.

International Search Report received in PCT Application No. PCT/US2013/048575, dated Sep. 5, 2013.

\* cited by examiner

INDIVIDUALIZING GENERIC COMMUNICATIONS

CROSS REFERENCE TO RELATED APPLICATIONS

Reference is made to co-pending U.S. patent application Ser. No. 13/537,097, concurrently filed herewith, entitled: "Determining an interest level for an image", by Fedorovskaya et al.; to co-pending U.S. patent application Ser. No. 13/537,100, concurrently filed herewith, entitled: "Method for presenting high-interest-level images", by Fedorovskaya et al.; to co-pending U.S. patent application Ser. No. 13/537,105, concurrently filed herewith, entitled: "System for presenting high-interest-level images", by Fedorovskaya et al.; to co-pending U.S. patent application Ser. No. 13/537,099, concurrently filed herewith, entitled: "Modifying digital images to increase interest level", by Fedorovskaya et al.; and to co-pending U.S. patent application Ser. No. 13/537,106, concurrently filed herewith, entitled: "System for modifying images to increase interestingness", by Fedorovskaya et al., each of which is incorporated herein by reference.

FIELD OF THE INVENTION

The present invention relates to communications using digital images to provide individualized communication using attributes found in images that include the individuals.

BACKGROUND OF THE INVENTION

Digital imaging has vastly increased people's ability to amass very large numbers of still images, video image sequences, and multimedia records, and for combining one or more images and other content, for their personal collections. (Still images, video sequences, and multimedia records are referred to collectively herein with the term "image records", or "images" as appropriate.)

Efforts have been made to aid users in organizing and utilizing image records by assigning metadata to individual image records that indicate a metric of expected value to the user. For example, many online databases and photo sharing communities allow users to designate images as favorites by selecting tags and labels, or to assign a rating for photos, such as image quality or aesthetics, or otherwise express their opinions by writing notes, issuing virtual awards and invitations to special user groups. An online photo-enthusiast community, Flickr, for example, introduced selection of most interesting images for any point in time, wherein the "interestingness" is determined by considering several aspects associated with images including clicks (e.g. number, authorship), presence or absence of comments, favorite tags, and who made them. Often, a favorite tag or other comparable tags, (e.g. Facebook's "like" tag) are counted to provide a sort of popularity ranking. Sites such as the DCPchallenge photosharing site or, similarly, Photobucket, encourage users to rate images on overall quality on a scale of 1 to 10 through contests and challenges. By doing so, all these databases allow users to efficiently access the best or most popular images. These communities consist of photo-enthusiasts, amateur, or even professional photographers who attempt to capture and create unique and artistic images. They often choose unusual subject matter, lighting, colors, or create specific effects by editing their images with various creative and photo editing tools.

Several online photo storage and sharing services, such as Kodak Gallery, Shutterfly, or Picasa, are primarily serving consumers, who capture and share snapshots of everyday events and special moments with family and friends. Social media sites, such as Facebook, are also increasingly accumulating millions of consumer images as a means of keeping in touch with friends. Users can upload their photos and share them with friends, as well as create prints, photo-books and other photo-related items. Similarly to online photo sharing communities, these services allow users to selectively mark images as favorites, for example, by using the "Like" tag, and create other tags and annotations. In addition to pictures, users increasingly upload and share video snippets, video files and short movies. YouTube is one of the most prominent examples of a video sharing and publishing service, wherein users can upload video files in the form of videos, short movies or commercials to share personal experiences, broadcast multimedia information for education purposes, or promote specific services and products. However, compared to the communities of photo-enthusiasts and public and commercial image and multimedia databases, tags and rankings are used considerably less frequently for images of friends and family, thereby limiting their applicability for efficient image organization and retrieval.

To assist users in selecting and finding the best or most suitable images on demand, various algorithms and methods have been developed. These methods analyze and evaluate subject matter categories, location, scene types, faces of people in the photo and their identities, other image attributes for image organization and retrieval purposes extracted directly from image data or associated metadata. For example, the published article of D. Joshi, and J. Luo, "Inferring Generic Activities and Events using Visual Content and Bags of Geo-tags", *Proceedings of Conference on Image and Video Retrieval*, 2008 provides a method for classifying an image into a plurality of activity/event scene categories in a probabilistic framework leveraging image pixels and image meta-data. The image pixel information is analyzed using the state-of-the-art support vector machine (SVM)-based event/activity scene classifiers described in the published article of A. Yanagawa, S. F. Chang, L. Kennedy, and W. Hsu, "Columbia University's Baseline Detectors for 374 LSCOM Semantic Visual Concepts", *Columbia University ADVENT Technical Report* #222-2006-8, 2007. These classifiers use image color, texture, and shape information for activity/event classification.

The metadata information in the form of GPS data available with pictures is leveraged to obtain location specific geo-tags from a geographic database. Subsequently, a bag-of words model is used for detecting activity/event scenes in pictures, and combined with the SVM data to provide a final classification.

While organization and retrieval of images based on image understanding and semantic analysis are very useful, selection based on subjective attributes, image quality, preference, subjective importance, predicted aesthetic and emotional value allows users to quickly access the best or most popular images in the collection.

For example, U.S. Pat. No. 6,671,405 to Savakis et al, discloses a method for automatically computing a metric of "emphasis and appeal" of an image without user intervention. A first metric is based upon a number of factors, which can include: image semantic content (e.g. people, faces); objective features, such as colorfulness and sharpness; and main subject features, such as size of the main subject. A second metric compares the factors relative to other images in a collection. The factors are integrated using a trained reasoning engine. U.S. Patent Publication No. 2004/0075743 is somewhat similar and discloses image sorting of images based upon user selected parameters of semantic content or objective features in the images.

U.S. Patent Publication No. 2003/0128389 A1, filed by Matraszek et al., discloses another approach by providing a measure of image record importance, "affective information" that can take the form of a multi-valued metadata tag. The affective information can be a manual entry or can be automatically detected user reactions, e.g. facial expressions or physiological responses, or user initiated utilization of a particular image, such as how many times an image was printed or sent to others via e-mail. In these cases, affective information is identified with a particular user.

A method for providing image metadata using viewing time is disclosed in U.S. Pat. No. 7,271,809 B2 by Fedorovskaya et al. In this disclosure, the time intervals during which the user chooses to view each of the still digital images on the electronic displays are being electronically monitored, and used to determine the degree of interest for each of the stored images. Subsequently, the metadata can be stored in each respective digital image file and can be used to assist in retrieving one or more still digital images.

Another method, described in U.S. Pat. No. 8,135,684 B2 by Fedorovskaya et al., discloses combining data from multiple sources with respect to images, including capture-related data, intrinsic image data, image-quality data, image-content data, and image-usage data, to generate a value index for the images, and then managing the image sets using thresholded-value indices.

While the above approaches of rating, ranking, and tagging images are useful, they are predominantly oriented toward selecting favorite, high-quality images for personal use. In some cases, the content (or subject matter) of images can be specified by the user, and selection and retrieval often rely on availability of tagging and annotation. Even if these methods employ user reactions that were previously tagged, they do not take into account behavior, associations, habits and preferences of the users formed in their everyday lives that affect how people will react to photographs of different content and appearance. Affective metadata tagging is also limited in that it requires exposure and accumulation of tags with respect to already viewed images and does not directly translate to novel, unseen, or untagged content. At the same time, ranking and tagging of publicly available multimedia entries in online databases and communities by themselves do not allow selection of material personalized according to individual preferences, interests and needs, but rather produces an account of items popularity on average.

With very large numbers of image records, rapid expansion of social networks and shared social media, as well as with an increasing range of applications, there is a growing need for new and improved image and multimedia selection methods that take into consideration how users will respond to the selected content, even if it is novel and untagged, and specifically whether individual users will find it interesting and worthy of their attention.

In this regard, research in psychology, neuroscience, communication and advertising is providing useful information with respect to the nature of people's preferences, interests and reactions to objects and situations, including complex imagery, and underlying perceptual and cognitive processing. This information can be used in developing algorithms and methods for rating and selecting images and multimedia content suitable for personal usage, as well as for visual communication, persuasion, advertising and other uses.

Photographs are not mere artifacts but represent semiotic systems from which viewers derive meaning. In doing so, people draw on accumulated past experiences to make sense of photographs according to Scott, "Images in Advertising: The Need for a Theory of Visual Rhetoric", *The Journal of Consumer Research, Vol.* 21, *No.* 2 (September, 1994), pp. 252-273). They may thus be attracted to an image at first glance because of its quality, aesthetic properties or low-level features, but viewers subsequently determine what is worthy of further study based on the potential that they see in the image generating deeper meaning.

Previous research has shown that verbal communication on familiar topics or persons was thought of as more interesting than verbal communication on unfamiliar ones, indicating that the inherent interestingness of a communication is directly related to its degree of perceived informativeness, wherein they are dependent both upon the "possibility of getting to know something new about something already sufficiently well known" (Teigen, K., "The novel and the familiar: Sources of interest in verbal information", *Current Psychology,* 1985. 4(3): p. 224-238.). This and other work highlight the link between what people find interesting and their familiarity with respect to the communicated information.

In contrast to 'recollections' that entail consciously 'remembering' an item, familiarity spurs a form of associative recognition and has been explained as arising when "fluent processing of an item is attributed to past experience with that item" (Yonelinas, A., "The Nature of Recollection and Familiarity: A Review of 30 Years of Research", *Journal of Memory and Language,* 2002. 46(3): p. 441-517). Familiarity has been defined and measured in two ways: familiarity with an item's meaning, involving the amount of perceived knowledge one has about an item or its meaningfulness to the person, and familiarity with regards to frequency of exposure, i.e. the frequency with which one encounters an item.

The concept of 'interestingness' has been the subject of multiple interpretations. Interestingness has been interpreted as the attribute of an item, as the response of a user to an item, as an emotion, or simply as a psychological or behavioral reaction Vaiapury and Kankanhalli, in "Finding Interesting Images in Albums using Attention", *Journal of Multimedia,* 2008: p. 2-13, for instance specify interestingness as "an entity that arises from interpretation and experience, surprise, beauty, aesthetics and desirability", a process based on "how one interprets the world and one's accumulation of experience as embodied in the human cognition system". Interestingness has also been routinely equated to attention. Katti et al. in "Pre-attentive discrimination of interestingness in images. in Multimedia and Expo", 2008 *IEEE International Conference,* 2008, Hannover, Germany, qualified interestingness as "an aesthetic property that arouses curiosity and is a precursor to attention".

Interest has been put forward not only as a reaction of the cognitive system to stimulus, but has also been studied as an emotion. Apart from the variables of novelty, complexity and surprise, subjects in Halonen, R. S. Westman, and P. Oittinen. "Naturalness and interestingness of test images for visual quality evaluation", in *Image Quality and System Performance VIII. SPIE,* 2011, *IEEE,* also identified 'personal connection' and 'thought-provoking' as attributes that contribute to the interestingness of pictures.

As digital media becomes ever-more pervasive, the role of digital images in computing, especially in human-computer interaction (HCI) for user interfaces and design, as well as in such wide-ranging areas as education, social media, art, science, advertising, marketing, and politics, is rapidly becoming more significant. At the same time, the amount of communication between individuals and organizations is increasing rapidly and it is increasingly important that such communications meet the needs of the recipients; otherwise the recipient might ignore the communications or respond in undesired ways. Moreover, commercial communications, such as advertising, are increasingly targeted to ever-smaller groups and commercial organizations have an increased need to communicate clearly and persuasively to the smaller groups and even to specific individuals.

There is a need therefore, for an improved automated method for communicating with individuals that increases the individuals' interest in the communication and the likelihood of a desirable response to the communication.

SUMMARY OF THE INVENTION

In accordance with the present invention, a method is provided for making individualized communications, comprising:

a) providing one or more images including each of a plurality of individuals;

b) automatically extracting one or more individual appearance attributes for each of the individuals from the image including the individual;

b) providing a communication that is generic to the individuals;

c) using a processor to make an individualized communication for each of the individuals by modifying the generic communication in accordance with the one or more individual appearance attributes associated with the individual; and d) communicating the individualized communication to a corresponding individual.

The present invention provides an improved automated method for communicating with individuals that increases the individuals' interest in the communication and the likelihood of a desirable response to the communication.

These, and other, aspects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with and interchanged with, elements of other described embodiments. Many changes and modifications can be made within the scope of the present invention without departing from the spirit thereof, and the invention includes all such modifications. The figures below are not intended to be drawn to any precise scale with respect to relative size, angular relationship, or relative position or to any combinational relationship with respect to interchangeability, substitution, or representation of an actual implementation.

BRIEF DESCRIPTION OF THE DRAWINGS

The above and other features and advantages of the present invention will become more apparent when taken in conjunction with the following description and drawings wherein identical reference numerals have been used to identify identical features that are common to the figures, and wherein.

DETAILED DESCRIPTION OF THE INVENTION

Figure 1:
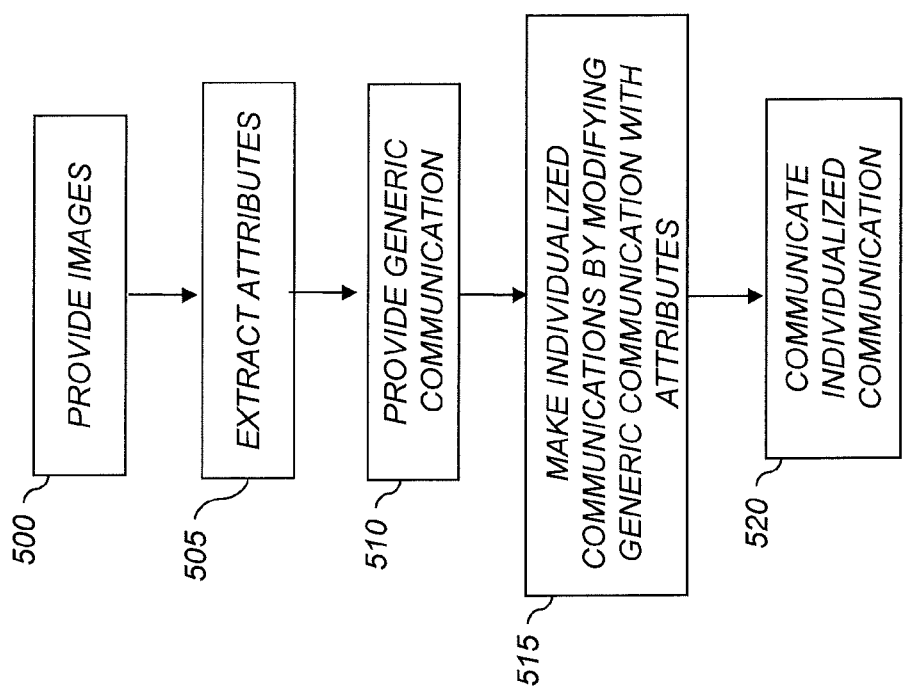
FIGS. 1-3 are flow diagrams according to various embodiments of the present invention.

According to various embodiments of the present invention and referring to FIG. 1, a method of making individualized communications includes providing one or more images including each of a plurality of individuals in step 500. One or more individual appearance attributes are automatically extracted for each of the individuals from the image including the individual in step 505. A communication that is generic to the individuals is provided in step 510. In step 515, a processor (for example as found in a computer or a portable computing device, such as a mobile phone) is used to make an individualized communication for each of the individuals by modifying the generic communication in accordance with the one or more individual appearance attributes corresponding to the individual. The individualized communication is then communicated to a corresponding individual in step 520.

Individual appearance attributes include information descriptive of an individual that can be represented in the visual form or inferred from an image of the individual, and therefore conveyed via facial features, complexion, hair color, eye color, specific clothing and clothing style, visible characteristic accessories, such as jewelry and eyewear, gait, gestures, body build as well as inferred weight, age, gender, race, and ethnicity.

The notion of individual appearance attributes can be generalized to include attributes of other modalities descriptive of an individual, such as, for example, voice, vocalization, a manner of speech, accent, and captured via a multimodal representation of the individual in a multimedia item. In the above example, the attributes of voice, vocalization are captured and communicated via recording, transmitting and playing sound. However, other modalities can also be used in the systems that provide the capability of capturing and communicating modalities, such as tactile modality and smell. In these cases, individual attributes that characterize the individual in tactile modality and smell must be extracted from the multimodal representation of the corresponding individual in the multimedia item and used to modify the multimodal generic communication which includes those modalities. Examples of individual attributes related to smell can include user's favorite and frequently used fragrances, or smells of favorite food. Tactile attributes can capture the surface properties of frequently touched personal items, such as for example, the wheel of the user's vehicle, a key ring, a wallet, or a smart phone.

Technologies that enable the usage of such attributes have been demonstrated and are known in the technology. For example, digital scent technology allows sensing, transmitting and receiving scent-enabled digital media, e.g. video games, movies and music. This technology can work by combining olfactometers and electronic noses. In 1999-2001, DigiScents developed a computer peripheral device called 'iSmell' which was designed to emit a smell when a user visited a web site or opened an email. The device contained a cartridge with 128 "primary odors," which could be mixed to replicate natural and man-made odors. DigiScents had indexed thousands of common odors, which could be coded, digitized, and embedded into web pages or email. Recently, Scentcom has created and marketed their version of digital scent technology to experience various scents as a part of multimedia interaction. The company's products use sets of scent cartridges comprising premixed and mixable scents that are dedicated to the specific media category, as well as customized cartridges designed on demand for specific applications. These scent cartridges are used to release and blend specific scents using company-developed air tunnel scent blending and ultrasonic micro-plugs technologies to support dynamic scent for multimedia.

To provide a tactile sensation to the user, haptic technology, or haptics, is used by applying forces, vibrations, or motions to the user. This mechanical stimulation can be used to assist in the creation of virtual objects in a computer simulation, to control such virtual objects, and to enhance the remote control of machines and devices (telerobotics). It has been described as "doing for the sense of touch what computer graphics does for vision". Haptic devices can incorporate tactile sensors that measure forces exerted by the user on the interface and actuators to generate mechanical stimulation for evoking tactile sensations. Such systems are widely used in robotics, virtual reality applications, video games and rehabilitation. Senseg has demonstrated tactile display technology on a table device, which uses an electrostatic field-based system to produce varying degrees of friction in different parts of the screen to modulate user experience of touch.

According to the present invention, familiarity can play a role in affecting the interest level of visual and multimedia information. Familiarity can be expected to have an effect on the interestingness judgment of viewers because of accumulated life experiences. As disclosed herein, by modifying a generic communication to include or resemble one or more individual appearance attributes associated with an individual and extracted from an image containing the individual, or individual attributes corresponding to the multimodal representation of the individual, such as attributes communicated for example, through sound, the individualized communication will have a stronger appeal to the individual and the individual will have an increased interest in the individualized communication because of the evoked sense of familiarity. Such individualized communication is thus characterized by the presence of the individualized appearance attributes or the multimodal individualized attributes that describe persons included in the individualized communication and are derived as a modification of initial or original attributes of the persons in the generic communication in accordance or using extracted individual appearance attributes or individual multimodal attributes. Moreover, other individuals having an interest in, having an emotional relationship with, or related to the individual will likewise have an increased interest in the individualized communication because they are also familiar and comfortable with the individualized appearance attributes or individualized attributes conveyed via other modalities included in the individualized communication.

Thus, according to embodiments of the present invention, by including individualized appearance attributes in a communication to one or more corresponding individuals familiar with the individualized appearance attributes will be more likely to attend to the communication and respond in a desirable way. Similarly, inclusion of multimodal individualized attributes, such as individualized attributes expressed via sound, or other modalities, in a communication will increase the likelihood of the target users familiar with the individualized attributes to attend to the communication and respond to it in a desirable manner.

As stated above, these individualized appearance attributes, and individualized attributes, conveyed through other modalities, in addition to or instead of visual representation, are produced as a modification of a generic communication in accordance with or by using the individual appearance attributes or multimodal individual attributes extracted from the corresponding images, in the form of still, video or multimedia items, which include or are associated with the corresponding individuals.

Thus, commercial organizations or persons creating communications, such as advertising messages, or messages that are intended to capture the attention of specific target users can increase the response rate to the individualized communications described herein. Other organizations, such as governments or public safety organizations can also benefit similarly.

According to embodiments of the present invention, individual appearance attributes are derived from digital images, including digital multimedia files. Each individual of a plurality of individuals can appear in one or more images in an image collection, for example digital images stored on storage media accessible to the processor of a computer. More than one individual can appear in a single image and more than one image can include a single individual. In other embodiments, individual attributes are derived from a sound trek that is included as a part of a digital multimedia item. In yet other embodiments, if a digital multimedia item contains information pertaining to other modalities in the representation of the individual, individual attributes for those modalities are extracted.

Figure 2:
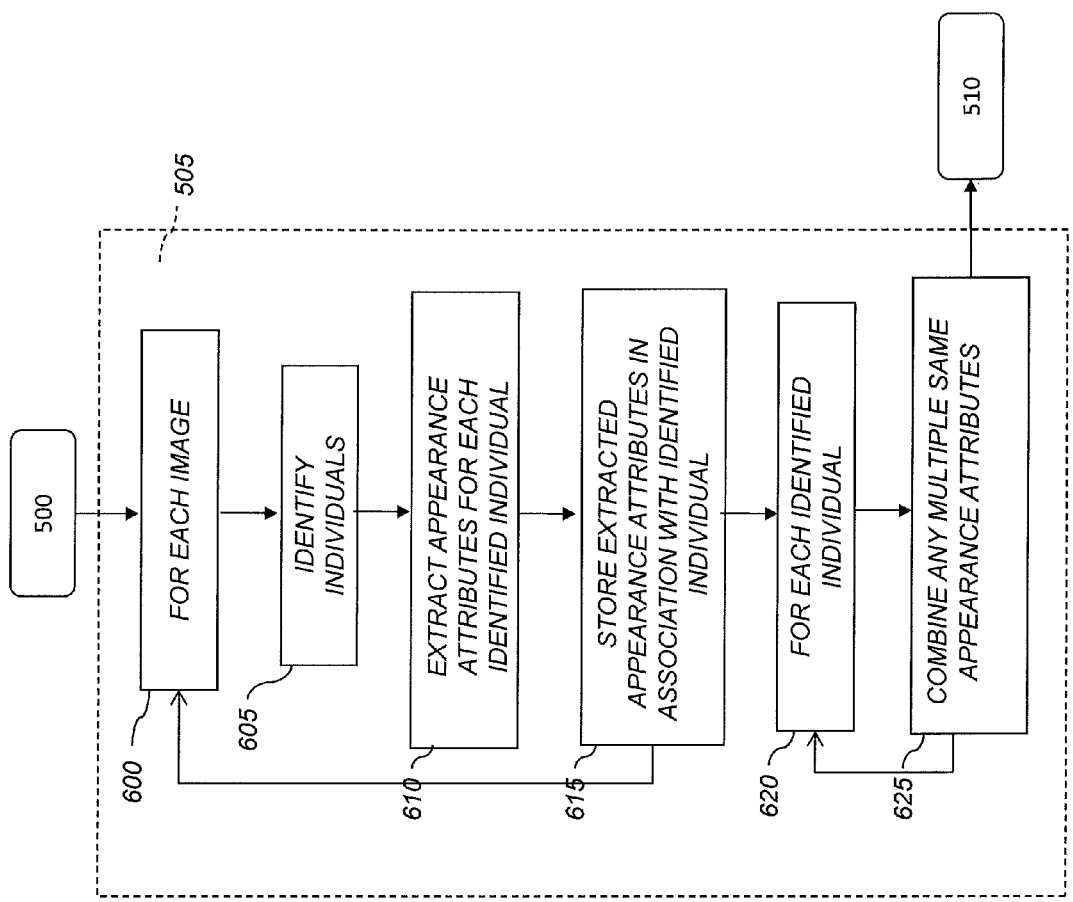

One or more individual appearance attributes or individual multimodal attributes are automatically extracted from the images and associated with an identified individual having the individual appearance attributes, respectively, for example by using a computer. Referring to FIG. 2, in a method of the present invention, a process for extracting the aforementioned individual attributes is illustrated. FIG. 2 is a detailed flow diagram of step 505. As shown in FIG. 2, after a collection of images is provided in step 500, individual appearance attributes or individual multimodal attributes are extracted in step 505 by iteratively analyzing each image in step 600.

For each image, the individuals in the image are identified in step 605, for example by programming a computer to access digital images electronically stored in an image collection and processing the images to detect and identify individuals in the images. Computer-executed programs for locating and identifying individuals in an image are well known and commercially available. The images are then further processed in step 610 to extract individual appearance attributes for each of the identified individuals. The individual appearance attributes can be, for example, objects found in the digital image in personal association with the identified individual or parts of the individual (e.g. hair). In other embodiments, in addition to visual, other individual multimodal attributes are used, the individuals can be identified by analyzing these additional modalities included in the multimedia data to detect and isolate features and characteristics pertaining to the individual, such as the voice. The individual multimodal attributes are then extracted, for example, a voice pitch, vocal "gestures", intonations, a timbre, and others.

Tools for extracting attributes from an image can be constructed using known programming techniques, for example including object detection and recognition, subject detection, facial element location and analysis, skin tone analysis, clothing detection, and sound and voice analysis. Software tools for detecting and identifying objects in a scene or for finding and analyzing portions of a human figure (e.g. face, hair, glasses, or skin color) are known in the art. The extracted information can include metrics indicating the reliability of the detection and of the amount detected and can be binary or have multiple values, either digital or continuous. Goodness parameters associated with the detection and analysis can aid in detecting, combining, averaging, and otherwise establishing individual appearance attributes or individual multimodal attributes.

According to various embodiments of the present invention, the individual appearance attributes include gender, complexion, hair color, eye color, facial features, age, clothing, clothing style, location, gait, gestures, voice, body build, and weight. The complexion can include racial attributes or ethnic attributes, such as skin color or facial features. According to other embodiments of the present invention, appearance attributes include clothing, personal accessories, elements, or objects of the individuals' environment in the images. In other alternative embodiments, individual attributes include sound of voice or voice characteristics, such as pitch, loudness and timbre, speech characteristics, such as intonations, speed and speech mannerisms and idiosyncrasies. In other embodiments, individual attributes include the smell of characteristic fragrances and odors associated with the individual or three-dimensional surface properties of favorite and frequently used objects identified in the available image (multimedia) data, files or items, containing such information.

The extracted information is stored in association with the identified individual in step 615. According to an embodiment, individual appearance attributes are stored in a database with information identifying the associated identified individual. Alternatively, the individual appearance attributes and or individual attributes of other modalities are stored in a file. Various methods for storing related information in databases or files are well known in the computing arts. The process repeats for each image and for each individual detected and identified in each image.

A single image can include multiple individuals, each of whom is identified and individual appearance attributes extracted. Likewise, an individual can appear in multiple images and individual appearance attributes extracted from each of the images. An individual can have different individual appearance attributes. The same individual appearance attributes can be extracted from multiple different images. Thus, according to an embodiment of the present invention, in iterative step 620, for each individual identified that has a plurality of the same individual appearance attributes, the same individual appearance attributes can be combined in step 625, for example by averaging values of an individual appearance attributes or by providing alternative values for the individual appearance attributes. Images from which individual appearance attributes are more readily or accurately extracted can be preferentially selected. Thus a better quality or wider variety of values can be obtained. Once the individual appearance attributes for each individual identified in each image are formed, the process can move to step 510 and the individual appearance attributes can be integrated into the generic communication to form an individualized communication as described in FIG. 1. A similar process can be used when any other additional individual attributes of different modalities are used.

In alternative embodiments, the individual appearance attributes are idealized. Such an idealization can be performed by modifying the individual appearance attributes to more closely match a perceived cultural norm or a desirable cultural norm. For example, where an individual appearance attribute reflects physical appearance, the physical appearance can be adjusted to provide a more ideal, but still familiar, appearance. A known method for accomplishing this is to substitute a given individual attribute by the closest prototypical attribute that is constructed as an average of measured attributes amongst a group of similar looking individuals (having similar phenotype). In addition, attributes of individuals that are considered as a standard or model of beauty, fitness, health, and so forth can also be included in the process of averaging. As a further example, weight, hair color, physical symmetry or uniformity, can be adjusted. In the case of auditory (sound-related), olfactory (smell-related), or haptic (tactile-related) attributes, the idealization can represent a corresponding standard or prototypical smell, sound and surface texture, available in existing standard databases, or gradually accumulated in a personal database.

Once individual appearance attributes and or individual multimodal attributes for one or more individuals are extracted from the digital images in the digital image collection, they can be made into an individualized communication. To do so, a generic communication is modified in accordance with individual appearance attributes. The generic communication can include an image of a single generic person or multiple persons. The persons can be modified identically or differently with attributes associated with a particular individual or different individuals. In one embodiment, the different individuals are part of an associated group of individuals, for example family members or friends.

The modification of the generic communication can be performed by modifying appearance attributes of a generic person in the communication with the individual appearance attributes associated with an individual. For example, hair color, skin color, body type, clothing, clothing style or colors can all be modified to individualize the communication and make the communication more interesting to a recipient associated with, comfortable with, or familiar with the individual appearance attributes. Software for performing morphological transforms (e.g. face "morphing") is known.

In a further embodiment of the present invention, audio recordings or other signal or media modalities corresponding to an individual are obtained and included in the set of individual attributes and associated with the individualized communication.

The individualized communication contains therefore the individualized appearance attributes and or the individualized multimodal attributes as a result of application of the corresponding individual attributes and or individual multimodal attributes towards relevant attributes contained in the generic communication.

Once constructed the individualized communication is communicated. In one embodiment of the present invention, the individualized communication is communicated to the individual associated with the individual appearance attributes and or individual multimodal attributes used to modify the generic communication. In this case, the individual will receive an individualized communication that looks like, or is familiar to, him or her. However, it is not necessary, or in some cases even desirable, that the individualized communication be recognizable as him or her. In other cases an individualized communication can sound like or is familiar to the individual, or exhibit familiarity in other available perceptual modalities.

In another embodiment, the individualized communication is communicated only to the individual having the associated individual appearance attributes. In other embodiments, the individualized communication is communicated to one or more persons having an emotional relationship with the associated individual, for example a friend or relative.

In embodiments of the present invention, the communication is an advertisement or a public service communication.

In a further embodiment, the communicator receives a reply from the individual in response to the communication.

Digital images and broadly, multimedia data, useful in the present invention can be collected from a variety of sources. In one embodiment, a digital image collection can be directly uploaded to a computer server, for example for use, review, or publication on an image-sharing website by an individual owner of the digital images. In some embodiments, the images of each of a plurality of individuals are obtained from a network-accessible collection of still or video images belonging to the individuals, or images containing a variety of digital data corresponding to a number of modalities, such as for example, three-dimensional surface texture or smell. Image collections can include images from single individuals, groups of associated individuals, or groups of individuals, and can include personal or publically accessible images. Images can be obtained from social-interaction websites.

Figure 3:
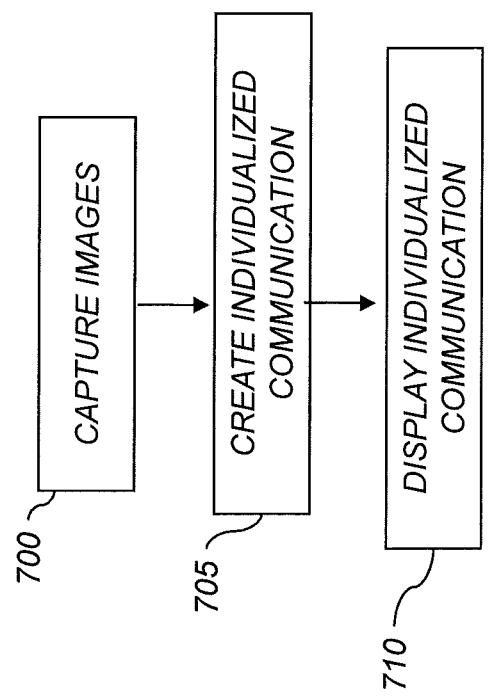

Referring to FIG. 3, images can also be obtained by capturing images of an individual, for example using an image-capture device such as a digital camera embedded in, or associated with, a personal computer, mobile computing, or personal communication devices. Alternatively, multisensory capture systems can be used to capture additional information corresponding for example, to sound, chemical compounds, involved in producing odors, vibration, and surface texture. In step 700, images of each of one or more individuals are captured while the individual observes a display, the captured image is processed to form an individualized communication in step 705 (as described in FIG. 1, steps 505-515), and the individualized communication communicated to the corresponding individual with the display in step 710 (corresponding to step 520 in FIG. 1). The display can be, for example, a television, a computer monitor, or the display of a personal communication device Experiment Support and further description of the efficacy of the methods of the present invention is now discussed further.

Interestingness includes the concept of meaningfulness and has been described by Haserot in: Haserot, F. S., "Beauty and Interestingness", *Journal of Philosophy*, 1952. XLIX(8): p. 261-273, as the "power of an object to awaken responses other than those called forth by its aesthetic form . . . interestingness generates a certain kind of significance. Form gives beauty; interestingness gives emotional or conceptual meaningfulness." A user response of interestingness is differentiated from an orienting response, which is considered to be a reflex, involuntary reaction to a novel stimulus. Examples of an orienting response include turning someone's head or gaze to an abruptly appearing stimulus, such as a sound, flicker or object motion. Consequently, interestingness is defined as a power of an object, such as an image or a multimedia item, to elicit a response from the viewer that results in a sustained attention that goes beyond a transient, orienting response.

Experiment Description

A controlled in-lab study was conducted to investigate how different forms of familiarity influence perceived interestingness of photos. Only photos with a single adult were considered, the photos were medium or wide-medium shots with the person facing primarily forward, the person has a casual or smiling facial expression, and the photo depicted a scene that fits into a context of interest. The contexts included: "Kitchen," "Office," "Birthday celebration," "Train station," "Car show," and "Arcade". The independent variable (IV), familiarity of photographs (with respect to content depicted in the photo), was separated as two dimensions: "familiarity of person" and "familiarity of context." Taking cues from the literature reviewed, familiarity of person was given four levels, varying along the degree of person knowledge. Familiarity of context had two levels. The main study thus followed a 4 (person familiarity) by 2 (context familiarity) within-subjects design. The dependent variable (DV), perceived interestingness, was measured with an absolute single-question measure (no comparisons) and a relative rank order measure (comparisons with other photos).

To convey person familiarity, visual similarity of the person was obtained through a face morphing procedure. The face of interest (i.e., the participant, friend, or celebrity) was morphed with the random or generic face in the original photo. The reason for morphing the faces was to more precisely investigate familiarity, not recognition, i.e., participants should think the face looks familiar to them, and not that they blatantly know the person in the photo. In a pre-study, it was found that a reasonable morphing threshold to express this minimal "sense or feeling of knowing" was a morph of 60%. It remained possible that the original degree to which the face of interest resembled the original face in the photo modulated the level of perceived similarity of the resultant morphed face. After the main study, participants were asked to rate the faces based on feature-based similarity (i.e., how much they perceived the morphed face to be similar to the face of interest by comparing facial features). On a more gestalt-based similarity (i.e., how much of the face of interest is perceived in the morphed face) this might ensure that the perceived visual similarity of each morphed photo was consistent at the fixed 60% morph level chosen.

Highly popular (but neutral on other aspects, e.g., beauty, liking) female and male celebrities were chosen from a survey in the pre-study. For the "friends" dimension of the IV, work colleagues were used. As with celebrities, it should be noted that there are also other categories of people, e.g., more casual friends, who are also personally familiar to a person, thus the study is specific to the choices made. Using the participants' company calendars, "friends" were selected based on whether the participant meets the friend face-to-face regularly, both of them have at least one point of contact such as a common project, and if they were of the same gender.

Photo stimuli were chosen from typical consumers' cameras and from image-sharing web-sites. All photos were edited for size (3600×2400 or vice-versa), brightness and contrast, and color-balance. Data was also collected on the pictures' overall image quality (generally how well the photo was taken), technical quality (e.g. how good the photo was in terms of color saturation, depth of field, focus), aesthetic quality (e.g. evaluation based on composition, perspective, colorfulness), and quality of editing (to account for morphing and integration editing differences).

For context familiarity, meaningfulness was provided by varying the frequency of exposure, resulting in the two levels of the IV (Familiar, Unfamiliar). Visual similarity of context was obtained by ensuring that typical elements of the context of interest were present (e.g., an office context must contain a desk and computer). The different contexts were chosen from survey results in the pre-study. Four different scenes were chosen for each context.

Experimental Process

A customized/morphed photo stimulus set was prepared for each participant. Each participant had 16 photos (4 person familiarity variations/scenes by 2 context familiarity variations by 2 contexts). Each participant viewed only photos of his/her own gender. The study required about 1.5 hours and was conducted in a conventional laboratory setting with the participant viewing photos on a 30" high-resolution LCD NEC monitor, while sitting approximately 35" away. A custom application was developed to display the photos consistently on the screen. Twenty-two males and 20 females participated, averaging 52.7 in age, 19 reporting as advanced and 23 as casual photographers.

Participants viewed the 16 photos individually, presented in random order with two practice photos at the beginning, in a free viewing session with no time limit. After selecting the photo, participants were presented with a 100-point scale to rate the photo based on how interesting it was perceived to be.

Experimental Analysis

Data analysis was done using the JMP software. For validation purposes, a t-test using the context familiarity scores from the post-questionnaire of the main study confirmed that participants were much more familiar ($F_{3,668}$=44.40, p<0.001) with the "Kitchen," "Office," and "Birthday celebration" contexts than with the "Train station," "Car show," and "Arcade" contexts. Pairwise comparisons showed that "Kitchen" and "Office" could be grouped together as "Familiar contexts," and "Train station" and "Arcade" as "Unfamiliar" contexts. "Birthday," however, stood as a separate group, and was not included in future interestingness analyses. "Familiarity with friend" scores showed that nearly all participants were very familiar with their "work colleague" and with the celebrities depicted.

Figure 4:
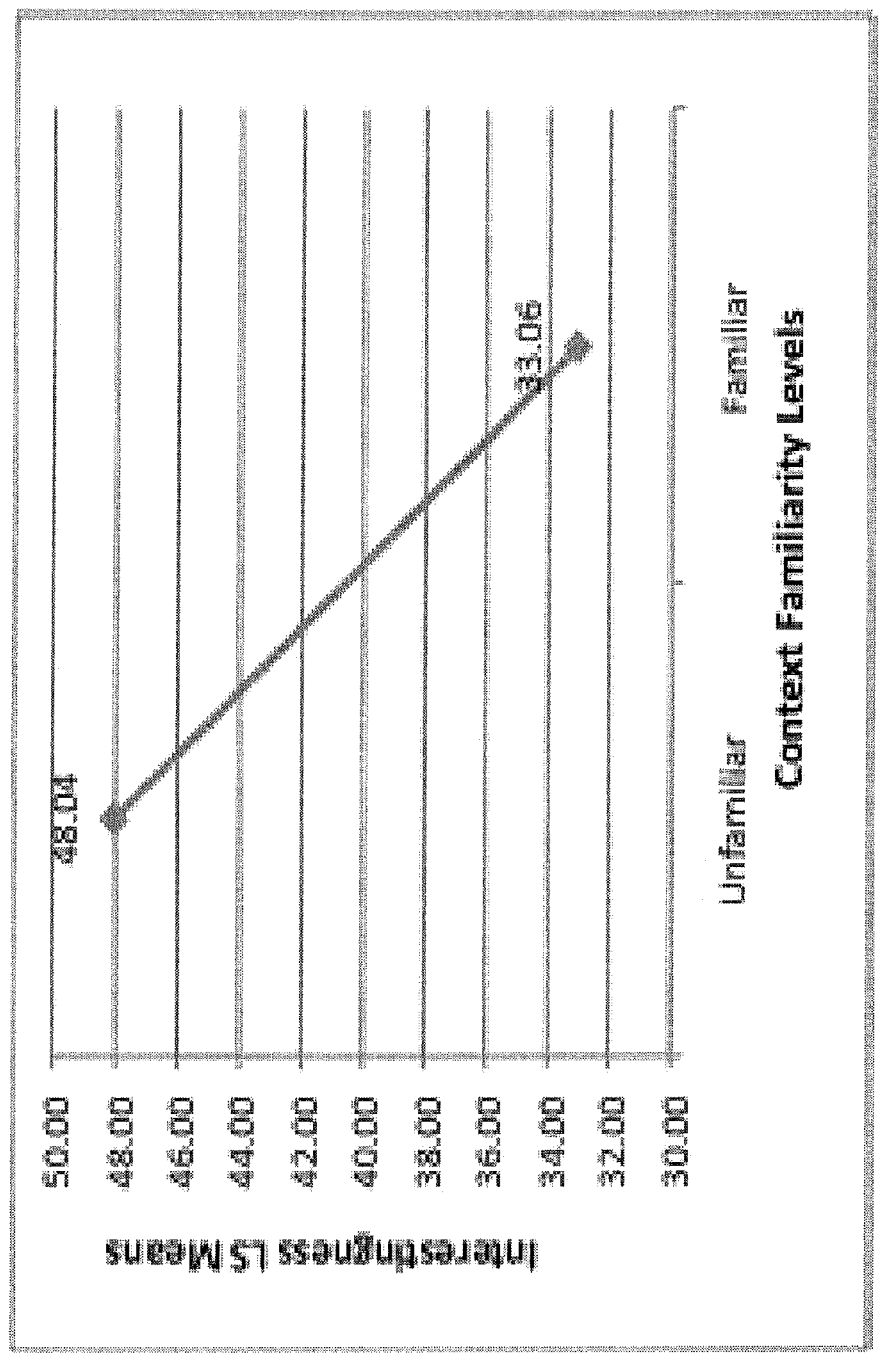
FIGS. 4-6 are graphs illustrating experimental results useful in understanding the present invention.
Figure 5:
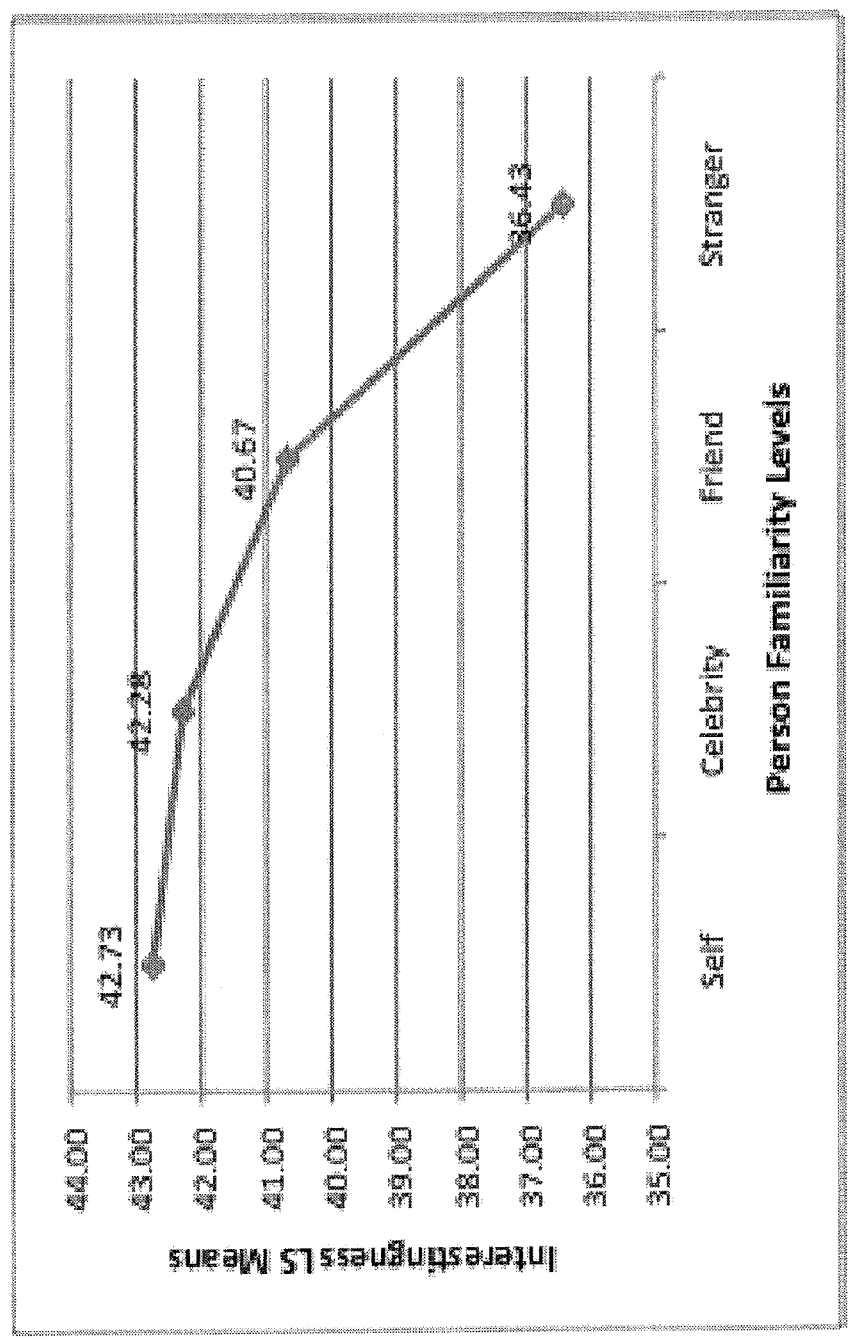

A variation analysis was conducted to examine the effect of person and context familiarity on the interestingness scores. Fixed factors in the model included person familiarity levels, context familiarity levels, participant gender and photography expertise, quality of photo editing, technical and aesthetic photo quality scores, and perceived similarity of morphed faces. The participant's emotional state was added as a random effect. There were statistically significant main effects for both context familiarity ($F_{1,624.2}$=139.49, p<0.0001) as shown in FIG. 4 and person familiarity ($F_{3,625.3}$=3.14, p<0.025) as shown in FIG. 5, as well as a significant interaction effect of Context familiarity×Gender ($F_{1,624.1}$=13.16, p<0.0003). No significant interaction was found for Person familiarity×Context familiarity, as well as for Person familiarity×Gender. Participant photography expertise, emotional state, and perceived similarity of morphed face were insignificant covariates. Quality of editing ($F_{1,631.8}$=20.15, p<0.0001), aesthetic quality ($F_{1,622.3}$=6.71, p<0.0098) and technical photo quality ($F_{1,622.1}$=4.75, p<0.0296) were seen to provide a significant, but small, contribution to interestingness scores. They were nevertheless taken into account in the overall model, and familiarity main effects remain significant even without the inclusion of these covariates.

Figure 6:
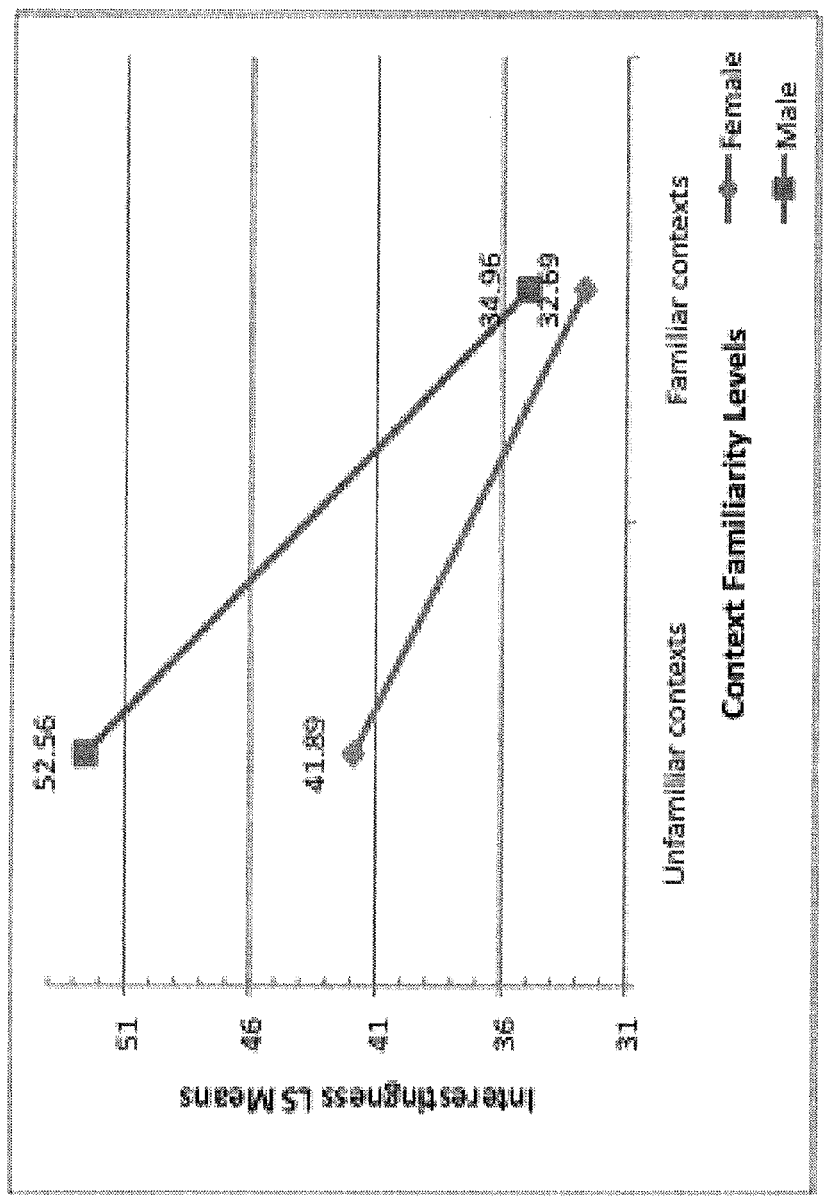

Photos with unfamiliar contexts ($\mu$=48.04) were much more interesting than photos with familiar contexts ($\mu$=33.06) regardless of gender, as shown in FIG. 6. However, unfamiliar context photos for males were significantly higher (p<0.0086) than for females. Regarding person familiarity, photos morphed with the Self ($\mu$=42.73) and Celebrity ($\mu$=42.28) were almost on par in terms of interestingness, with faces resembling self, producing yet higher interestingness ratings. Next were photos morphed with the Friend ($\mu$=40.67). Stranger photos were rated as the least interesting ($\mu$=36.43).

Experimental Conclusions

These results of the experiment suggest that personal familiarity can trigger the perception of an image as being more interesting than an unfamiliar image. Personally familiar faces in unfamiliar contexts appeared to produce the highest interestingness scores. Thus, the meaningfulness brought about by personal experiences with people in a picture can be a key influencing factor. For context, it appears that the novelty or curiosity that arises from seeing a rarely seen place overcomes the personal associations elicited by common sights. The prominence of the self-morphed photos in our interestingness results suggests that self-familiarity is unique, and perceived differently by viewers. Thus, according to the present invention, images having an increased interestingness to a viewer stimulate an increased likelihood of attending and processing a communication in which the images are included and an increased likelihood of a desirable response.

The present invention can be used by individuals, as well as an organization, such as a commercial or government organization, to improve communication with individuals. The organization accesses an image collection, extracts individual appearance attributes associated with an individual from the image collection, and communicates with corresponding individuals, such as the associated individual, a relative of the individual, or a friend of the individual.

Implementation Platforms

In the following description, some features are described as "software" or "software programs". Those skilled in the art will recognize that the equivalent of such software can also be readily constructed in hardware. Because image manipulation algorithms and systems are well known, the present description emphasizes algorithms and features forming part of, or cooperating more directly with, the method. General features of digital still, and video cameras, sensor-capture systems and computerized systems are likewise well known, and the present description is generally limited to those aspects directly related to the method of the invention. Other aspects of such algorithms and apparatus, and hardware or software for producing and otherwise processing the image signals involved therewith, not specifically shown or described herein may be selected from such systems, algorithms, components, and elements known in the art. Given the description as set forth herein, all additional software/hardware implementation is conventional and within the ordinary skill in the art. The present invention can be implemented in computer hardware and computerized equipment. For example, the method can be performed using a system including one or more digital cameras or other capture devices or one or more personal computers. It should also be noted that the present invention can be implemented in a combination of software or hardware and is not limited to devices, which are physically connected or located within the same physical location. Such systems are described further below.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often include red, green, and blue digital image channels. For multispectral and multimodal applications, additional channels can also be used to store spectral, multimodal or three-dimensional surface information, or other information in the form of masks, alpha channels and the like. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non rectilinear arrays with equal effect.

The term "image" or "image record" refers herein to a digital still image, video sequence, or multimedia record. An image record is inclusive of one or more images in any combination with sounds or other data. For example, image records can include multiple spectrum images, scannerless range images, digital album pages, multimedia video presentations, odor- and surface texture related data, information descriptive of the ambient environment and persons in the form of digital metadata and tags. Although discussion herein is generally directed to image records that are captured using a digital camera, image records can also be captured using other capture devices and by using photographic film or other means and then digitizing. When other data, such as information representing signals attributable to different sensory modalities is used, the capture devices can include chemical, vibrational, mechanical, sound, electric and other sensors. As discussed herein, image records are stored digitally along with associated information.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., camera, PDA or cell phone that can be used as a processing unit, a display unit, or a unit to give processing instructions), and as a service offered via the World Wide Web. These hardware devices (such as kiosks, personal computers, prints, mobile devices) can be equipped with means to selectively or summarily display various modalities of multimodal media information, such as visually observable images, video, movies, other multimedia items (e.g. presentations, text, and informational programs), play sound, generate (display) odors, vibrations, directed airflows and other haptic stimulation.

In each context, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The present invention can be implemented using conventional computing resource, for example, computers having processors or other stored program machines, information storage devices such as random access memory or non-volatile information storage such as rotating magnetic disks, and software programs. The steps illustrated in FIGS. 1-3 are performed, for example, by a programmable processor executing a software program and connected to a memory storage device, for example an electronic storage system, as described further below. The processor can be a standalone computer, e.g. a desktop computer, a portable computer, or a server computer. Alternatively the processor can be a networked computer capable of communicating with other networked computers and the tasks of the present invention are cooperatively performed by multiple interacting processors. The network is, for example, the internet or a cellular telephone network. In one embodiment, the steps of the present invention are performed with a client-server computer network. Such processors, computer systems, and communication networks are known in the computing industry.

A user can communicate from a remote location to provide digital images in the image collection. In further embodiments of the present invention, the plurality of digital images is received, for example, through a network, from an image source, for example a digital camera, remote client computer, or portable computer connected to a cellular telephony or WiFi network. In various embodiments, the plurality of digital images and other multimedia and multimodal data are stored in a permanent non-volatile storage device, such as rotating magnetic media or the plurality of digital images is stored in a volatile memory, for example, random access memory (RAM). Digital images and other relevant multimedia and multimodal data can be accessed from social-media web-sites and image-sharing web-sites through a computer network. The images can be associated with, stored by, controlled by, and owned by users who upload the pictures to the web-sites from personal computers or mobile communication and computing devices.

In one embodiment of the present invention, the various methods of the present invention are performed automatically using, for example, computer systems such as those described further below. Ways for receiving images, photo-product choices, and desired distributions, e.g. using communication circuits and networks, are known, as are ways for manually selecting digital images and specifying photo-products, e.g. by using software executing on a processor or interacting with an on-line computer server.

Images can include unknown or specifically known individuals therein. Face recognition and identification can be done automatically. Face recognition and identification can also be performed manually on an image, for example by an image owner. The information can be stored in association with the image (e.g. as metadata). Using computer methods described in the article "Rapid object detection using a boosted cascade of simple features," by P. Viola and M. Jones, in *Computer Vision and Pattern Recognition,* 2001, *Proceedings of the* 2001 *IEEE Computer Society Conference,* 2001, pp. I-511-I-518 vol. 1; or in "Feature-centric evaluation for efficient cascaded object detection", by H. Schneiderman, in *Computer Vision and Pattern Recognition,* 2004; *Proceedings of the* 2004 *IEEE Computer Society Conference,* 2004, pp. II-29-II-36, Vol. 2, the size and location of each face can be found within each digital image and is useful in determining close-up types of images and images containing people. These two documents are incorporated by reference herein in their entirety. Viola uses a training set of positive face and negative non-face images. The face classification can work using a specified window size. This window is slid across and down all pixels in the image in order to detect faces. The window is enlarged so as to detect larger faces in the image. The process repeats until all faces of all sizes are found in the image. Not only will this process find all faces in the image, it will return the location and size of each face.

Active shape models as described in "Active shape models—their training and application," by Cootes, T. F. Cootes, C. J. Taylor, D. H. Cooper, and J. Graham, *Computer Vision and Image Understanding*, vol. 61, pp. 38-59, 1995, can be used to localize all facial features such as eyes, nose, lips, face outline, and eyebrows. These documents are incorporated by reference herein in their entirety. Using the features that are thus found, one can then determine if eyes/mouth are open, or if the expression is happy, sad, scared, serious, neutral, or if the person has a pleasing smile Determining pose uses similar extracted features, as described in "Facial Pose Estimation Using a Symmetrical Feature Model", by R. W. Ptucha, A. Savakis, *Proceedings of ICME Workshop on Media Information Analysis for Personal and Social Applications*, 2009, which develops a geometric model that adheres to anthropometric constraints. This document is incorporated by reference herein in its entirety. With pose and expression information stored for each face, preferred embodiments of the present invention can be programmed to classify digital images according to these various detected types (happy, sad, scared, serious, and neutral).

A main subject detection algorithm, such as the one described in U.S. Pat. No. 6,282,317, which is incorporated herein by reference in its entirety, involves segmenting a digital image into a few regions of homogeneous properties such as color and texture. Region segments can be grouped into larger regions based on such similarity measures. Regions are algorithmically evaluated for their saliency using two independent yet complementary types of saliency features—structural saliency features and semantic saliency features. The structural saliency features are determined by measureable characteristics such as location, size, shape and symmetry of each region in an image. The semantic saliency features are based upon previous knowledge of known objects/regions in an image which are likely to be part of foreground (for example, statues, buildings, people) or background (for example, sky, and grass), using color, brightness, and texture measurements. For example, identifying key features such as flesh, face, sky, grass, and other green vegetation by algorithmic processing are well characterized in the literature.

In any of these embodiments, the digital image can be a still image, a graphical element, or a video image sequence, and can include an audio element. The digital images can be multi-media elements.

In one embodiment of the present invention, a computer system includes a computer server connected to a communication network for receiving communications from a remote client computer; and a computer program.

Various embodiments of the present invention can be implemented using a variety of computers and computer systems illustrated in FIGS. 7, 8 and 9 and discussed further below. In one preferred embodiment, for example, a desktop or laptop computer executing a software application can provide a multi-media display apparatus suitable for providing digital image collections or for receiving such. In an embodiment, a multi-media display apparatus includes: a display having a graphic user interface (GUI) including a user-interactive GUI pointing device; a plurality of multi-media elements displayed on the GUI, and user interface devices for providing a way for a user to enter information into the system. A desktop computer, for example, can provide such an apparatus.

In another preferred embodiment, a computer server can provide web pages that are served over a network to a remote client computer. The web pages can permit a user of the remote client computer to provide digital images. Applications provided by the web server to a remote client can enable presentation of selected multi-media elements, either as stand-alone software tools or provided through html, Java, or other known Internet interactive tools. In this preferred embodiment, a multi-media display system includes: a server computer providing graphical user interface display elements and functions to a remote client computer connected to the server computer through a computer network such as the internet, the remote client computer including a display having a graphic user interface (GUI) including a user-interactive GUI pointing device; and a plurality of multi-media elements stored on the server computer, communicated to the remote client computer, and displayed on the GUI.

Computers and computer systems are stored program machines that execute software programs to implement desired functions. According to a preferred embodiment of the present invention, a software program executing on a computer with a display and graphic user interface (GUI) including a user-interactive GUI pointing device includes software for displaying a plurality of multi-media elements having images on the GUI and for performing the steps of the various methods described above.

Figure 7:
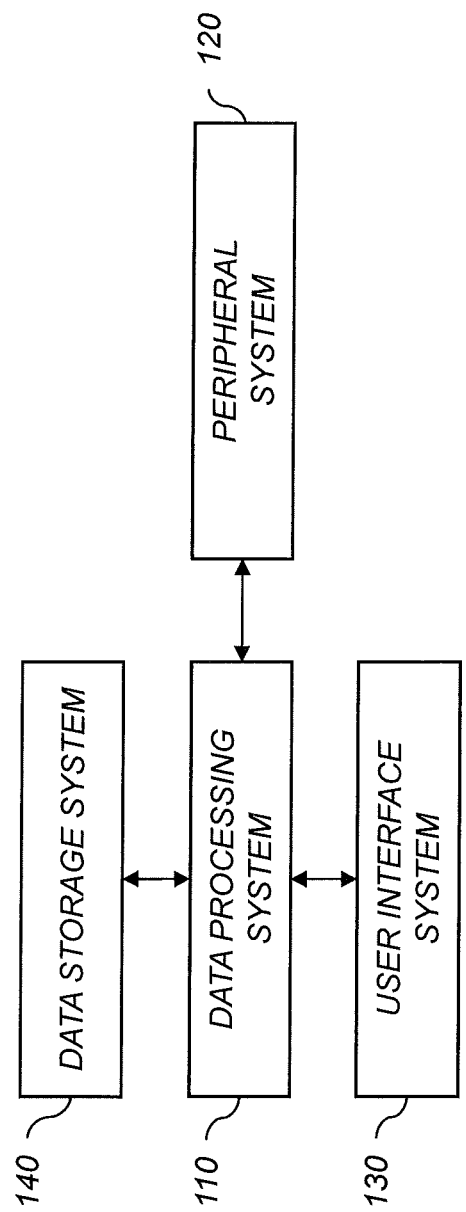
FIG. 7 is a simplified schematic of a computer system useful for the present invention.

FIG. 7 is a high-level diagram showing the components of a system useful for various embodiments of the present invention. The system includes a data processing system 110, a peripheral system 120, a user interface system 130, and a data storage system 140. The peripheral system 120, the user interface system 130 and the data storage system 140 are communicatively connected to the data processing system 110. The system can be interconnected to other data processing or storage system through a network, for example the internet.

The data processing system 110 includes one or more data processing devices that implement the processes of the various preferred embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, a digital picture frame, cellular phone, a smart phone or any other device for processing data, managing data, communicating data, or handling data, whether implemented with electrical, magnetic, optical, biological components, or otherwise.

The data storage system 140 includes one or more processor-accessible memories configured to store information, including the information needed to execute the processes of the various preferred embodiments of the present invention, including the example processes described herein. The data storage system 140 can be a distributed processor-accessible memory system including multiple processor-accessible memories communicatively connected to the data processing system 110 via a plurality of computers or devices. On the other hand, the data storage system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data is communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital content records to the data processing system 110. For example, the peripheral system 120 can include digital still cameras, digital video cameras, cellular phones, smart phones, or other data processors. The data processing system 110, upon receipt of digital content records from a device in the peripheral system 120, can store such digital content records in the data storage system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the data storage system 140 even though the user interface system 130 and the data storage system 140 are shown separately in FIG. 7.

Figure 9:
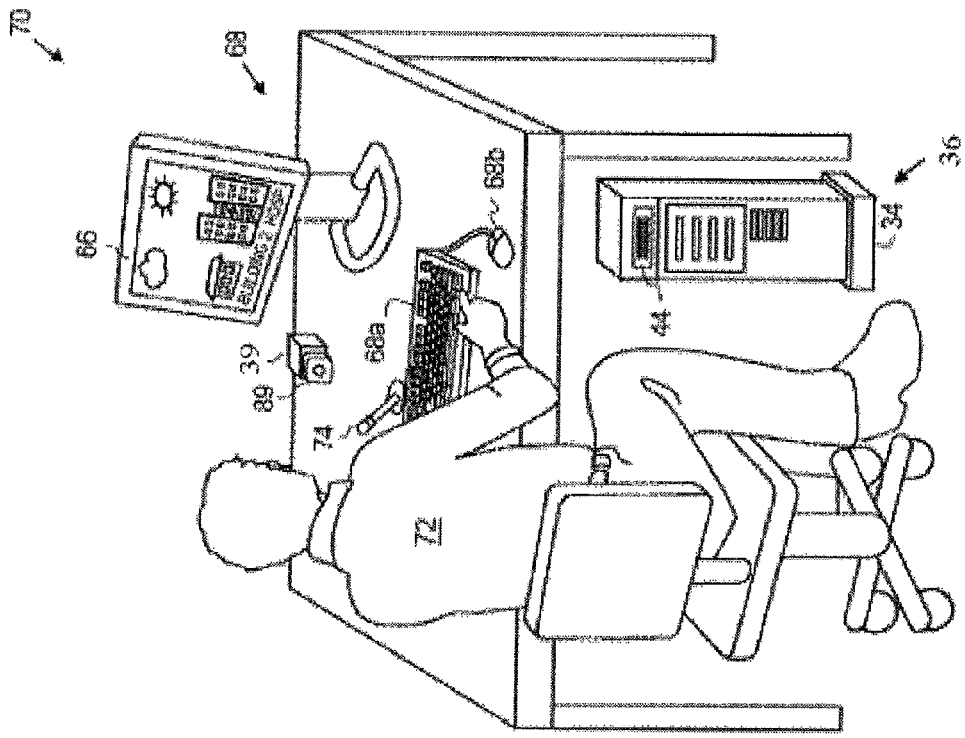
FIG. 9 is a schematic of another computer system useful for embodiments of the present invention.
Figure 8:
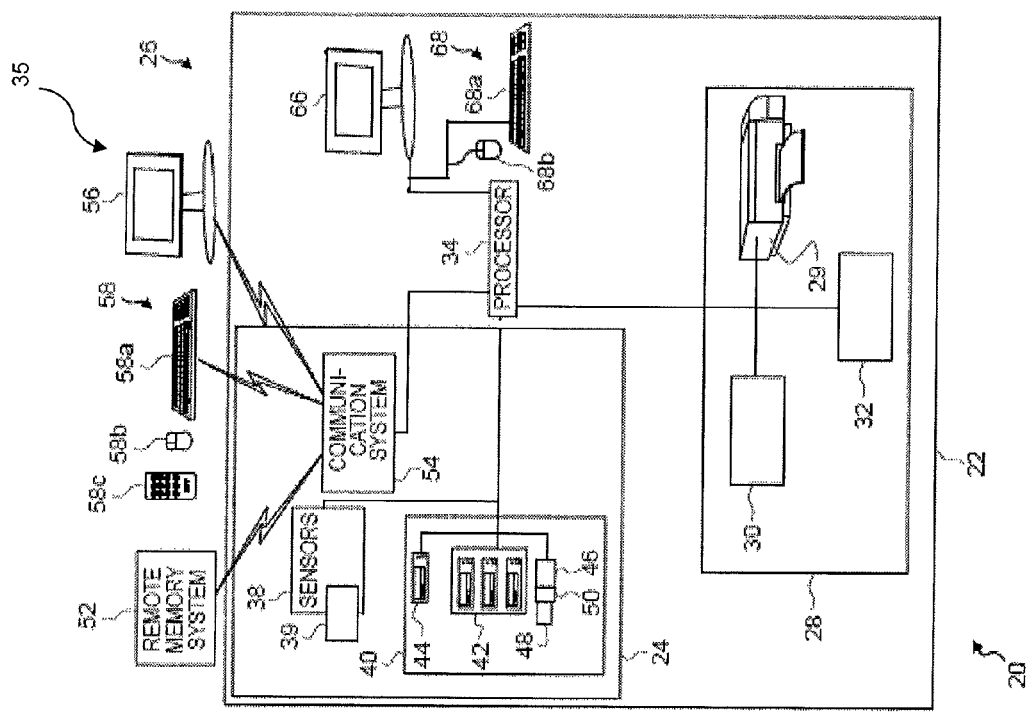
FIG. 8 is a schematic of a computer system useful for embodiments of the present invention.

Referring to FIGS. 8 and 9, computers, computer servers, and a communication system are illustrated together with various elements and components that are useful in accordance with various preferred embodiments of the present invention. FIG. 8 illustrates a preferred embodiment of an electronic system 20 that can be used in generating an image product or image-product specification. In the preferred embodiment of FIG. 8, electronic system 20 includes a housing 22 and a source of content data files 24, a user input system 26 and an output system 28 connected to a processor 34. The source of content data files 24, user-input system 26 or output system 28 and processor 34 can be located within housing 22 as illustrated. In other embodiments, circuits and systems of the source of content data files 24, user input system 26 or output system 28 can be located in whole or in part outside of housing 22.

The source of content data files 24 can include any form of electronic or other circuit or system that can supply digital data to processor 34 from which processor 34 can derive images for use in forming an image-enhanced item. In this regard, the content data files can include, for example and without limitation, still images, image sequences, video graphics, and computer-generated images. Source of content data files 24 can optionally capture images to create content data for use in content data files by use of capture devices located at, or connected to, electronic system 20 or can obtain content data files that have been prepared by or using other devices. In the preferred embodiment of FIG. 8, source of content data files 24 includes sensors 38, a memory 40 and a communication system 54.

Sensors 38 are optional and can include light sensors, biometric sensors and other sensors known in the art that can be used to detect conditions in the environment of system 20 and to convert this information into a form that can be used by processor 34 of system 20. Sensors 38 can also include one or more video sensors 39 that are adapted to capture images. Sensors 38 can also include biometric or other sensors for measuring involuntary physical and mental reactions such sensors including, but not limited to, voice inflection, body movement, eye movement, pupil dilation, body temperature, and brain waves sensors. Sensors 38 can also include chemical, electric, acoustic and mechanical and other sensors intended to measure attributes related to odor, vibration and surface property.

Memory 40 can include conventional memory devices including solid-state, magnetic, optical or other data-storage devices. Memory 40 can be fixed within system 20 or it can be removable. In the embodiment of FIG. 8, system 20 is shown having a hard drive 42, a disk drive 44 for a removable disk such as an optical, magnetic or other disk memory (not shown) and a memory card slot 46 that holds a removable memory 48 such as, a removable memory card, and has a removable memory interface 50 for communicating with removable memory 48. Data including, but not limited to, control programs, digital images and metadata can also be stored in a remote memory system 52 such as a personal computer, computer network or other digital system. Remote memory system 52 can also include solid-state, magnetic, optical or other data-storage devices.

In the embodiment shown in FIG. 8, system 20 has a communication system 54 that in this preferred embodiment can be used to communicate with an optional remote memory system 52, an optional remote display 56, or optional remote input 58. The optional remote memory system 52, optional remote display 56, optional remote input 58 can all be part of a remote system 35 having the remote input 58 having remote input controls 58c (also referred to herein as "remote input 58"), can include the remote display 56, and that can communicate with communication system 54 wirelessly as illustrated or can communicate in a wired fashion. In an alternative embodiment, a local input station including either or both of a local display 66 and local input controls 68 (also referred to herein as "local user input 68") can be connected to communication system 54 using a wired or wireless connection.

Communication system 54 can include for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or the remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the interne, a cellular, peer-to-peer or other form of mobile telecommunication network, a local communication network, such as a wired or wireless local area network or any other conventional wired or wireless data transfer system. In one useful preferred embodiment, the system 20 can provide web access services to remotely connected computer systems (e.g. remote systems 35) that access the system 20 through a web browser. Alternatively, remote system 35 can provide web services to system 20 depending on the configurations of the systems.

User input system 26 provides a way for a user of system 20 to provide instructions to processor 34. This permits such a user to make a designation of content data files to be used in generating an image-enhanced output product and to select an output form for the output product. User input system 26 can also be used for a variety of other purposes including, but not limited to, permitting a user to arrange, organize and edit content data files to be incorporated into the image-enhanced output product, to provide information about the user or audience, to provide annotation data such as voice and text data, to identify characters in the content data files, and to perform such other interactions with system 20 as will be described later.

In this regard user input system 26 can include any form of transducer or other device capable of receiving an input from a user and converting this input into a form that can be used by processor 34. For example, user input system 26 can include a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the preferred embodiment shown in FIG. 8, user input system 26 includes an optional remote input 58 including a remote keyboard 58a, a remote mouse 58b, and a remote control 58c and a local input 68 including a local keyboard 68a and a local mouse 68b.

Remote input 58 can take a variety of forms, including, but not limited to, the remote keyboard 58a, remote mouse 58b or remote control handheld device 58c illustrated in FIG. 8. Similarly, local input 68 can take a variety of forms. In the preferred embodiment of FIG. 8, local display 66 and local user input 68 are shown directly connected to processor 34.

As is illustrated in FIG. 9, local user input 68 can take the form of a home computer 36 having a processor 34 and disc drive 44, an editing studio, or kiosk 70 (hereafter also referred to as an "editing area 70") that can also be a remote system 35 or system 20. In this illustration, a user 72 is seated before a console including a local keyboard 68a and mouse 68b and a local display 66 which is capable, for example, of displaying multimedia content. As is also illustrated in FIG. 9, editing area 70 can also have sensors 38 including, but not limited to, video sensors 39, digital cameras 89, audio sensors 74 and other sensors such as multispectral sensors that can monitor user 72 during a production session.

Referring back to FIG. 8, output system 28 is used for rendering images, text or other graphical representations in a manner that permits image-product designs to be combined with user items and converted into an image product. In this regard, output system 28 can include any conventional structure, system, or output device 32 that is known for printing or recording images, including, but not limited to, printer 29. Printer 29 can record images on a tangible surface 30 using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as a type of printer that generates color images. However, it will be appreciated that the claimed methods and apparatus herein can be practiced with a printer 29 that prints monotone images such as black and white, grayscale, or sepia toned images. As will be readily understood by those skilled in the art, a system 35, 20 with which a user interacts to define a user-personalized image product can be separated from a remote system (e.g. 35, 20) connected to a printer, so that the specification of the image product is remote from its production.

In certain embodiments, the source of content data files 24, user input system 26 and output system 28 can share components.

Processor 34 operates system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

The invention has been described in detail with particular reference to certain preferred embodiments thereof, but it will be understood that variations and modifications can be effected within the spirit and scope of the invention.

PARTS LIST 20 system
22 housing
24 source of content data files
26 user input system
28 output system
29 printer
30 tangible surface
32 output device
34 processor
35 remote system
36 computer
38 sensors
39 video sensors
40 memory
42 hard drive
44 disk drive
46 memory card slot
48 removable memory
50 memory interface
52 remote memory system
54 communication system
56 remote display
58 remote input
58a remote keyboard
58b remote mouse
58c remote control
66 local display
68 local input
68a local keyboard
68b local mouse
70 home computer, editing studio, or kiosk ("editing area")
72 user
74 audio sensors
89 digital camera
110 data processing system
120 peripheral system
130 user interface system 140 data storage system
500 provide image collection step
505 extract attributes step
510 provide generic communication step
515 make individualized communications by modifying generic communication with individual appearance attributes step
520 communicate individual appearance attributes step
600 iterate for each image step
605 identify individuals step
610 extract appearance attributes for each individual step
615 store extracted appearance attributes in association with identified individual step
620 iterate for each identified individual step
625 combine any multiple same appearance attributes step
700 capture image step
705 create individualized communication step
710 display individualized communication step

The invention claimed is:

1. A method of making individualized communications, comprising:
   a) providing one or more images including each of a plurality of individuals;
   b) automatically extracting one or more individual appearance attributes for each of the individuals from the one or more images including the individual;
   b) providing a communication that is generic to the individuals;
   c) using a processor to make an individualized communication for each of the individuals by modifying the generic communication in accordance with the one or more individual appearance attributes associated with the individual; and
   d) communicating the individualized communication to a corresponding individual.

2. The method of claim 1, wherein the communication of the individualized communication is communicated only to the individual having the associated individual appearance attributes.

3. The method of claim 1, wherein the individualized appearance attributes are gender, complexion, hair color, eye color, facial features, age, clothing, clothing style, location, gait, gestures, voice, symmetry, uniformity, body build, and weight.

4. The method of claim 3, wherein the complexion includes racial attributes or ethnic attributes.

5. The method of claim 4, wherein the racial or ethnic attributes include skin color or facial features.

6. The method of claim 1, further including idealizing the individual appearance attributes.

7. The method of claim 1, wherein the communication is an advertisement or a public service communication.

8. The method of claim 1, further including extracting one or more individual appearance attributes from two or more images of an individual.

9. The method of claim 1, wherein the two or more images are of the same individual.

10. The method of claim 1, further including obtaining the images of each of a plurality of individuals from a network-accessible collection of still or video images belonging to the individuals.

11. The method of claim 1, further including obtaining the images of each of a plurality of individuals from an image of the individual observing a display and communicating the individualized communication to the corresponding individual with the display.

12. The method of claim 11, wherein obtaining the images includes capturing the images using an image-capture device.

13. The method of claim 12, wherein the image-capture device is associated with the display.

14. The method of claim 11, wherein the display is a television, a computer monitor, or the display of a personal communication device.

15. The method of claim 1, wherein the generic communication includes one or more images of one or more persons.

16. The method of claim 1, wherein the individual appearance attributes includes clothing, accessories, or environmental objects.

17. The method of claim 1, wherein the individual appearance attribute modifies the location or surroundings presented in the generic communication.

18. The method of claim 1, further including obtaining audio recordings corresponding an image and including the audio recording in the individual appearance attribute.

19. The method of claim 1, wherein the corresponding individual is a person having an emotional relationship with the associated individual.

20. The method of claim 1, wherein the corresponding individual is a relative or a friend of the associated individual.

21. The method of claim 1, wherein the one or more images is a multimedia image including a multimodal representation of each of a plurality of individuals.

* * * * *

UNITED STATES PATENT AND TRADEMARK OFFICE
CERTIFICATE OF CORRECTION

PATENT NO. : 8,842,882 B2  Page 1 of 1
APPLICATION NO. : 13/537112
DATED : September 23, 2014
INVENTOR(S) : Elena A. Federovskaya et al.

It is certified that error appears in the above-identified patent and that said Letters Patent is hereby corrected as shown below:

In the Claims

Column 24, line 10 (Claim 9, line 1), replace "claim 1" with --claim 8--.

Column 24, line 36 (Claim 18, line 2), insert the word --to-- after the word "corresponding".

Signed and Sealed this
Twenty-first Day of April, 2015

Michelle K. Lee
*Director of the United States Patent and Trademark Office*